United States Patent [19]

Gambell et al.

[11] Patent Number: 5,075,022

[45] Date of Patent: Dec. 24, 1991

[54] HEAT TRANSFER FLUIDS

[75] Inventors: James W. Gambell, St. Louis; John F. Herber, Clayton, both of Mo.; Quentin E. Thompson, Belleville, Ill.

[73] Assignee: Monsanto Company, St. Louis, Mo.

[21] Appl. No.: 420,412

[22] Filed: Oct. 12, 1989

Related U.S. Application Data

[63] Continuation of Ser. No. 280,601, Dec. 8, 1988, which is a continuation-in-part of Ser. No. 160,554, Feb. 24, 1988, abandoned.

[51] Int. Cl.$^5$ .............................. C09K 5/00; F24J 2/04
[52] U.S. Cl. ........................................ 252/73; 252/570; 252/578; 126/900
[58] Field of Search ...................... 252/73, 578, 570; 126/900, 443

[56] References Cited

U.S. PATENT DOCUMENTS

| | | | |
|---|---|---|---|
| 1,882,809 | 2/1929 | Grebe | 252/67 |
| 2,741,598 | 4/1956 | Good et al. | 252/78 |
| 2,883,331 | 4/1959 | Bolt et al. | 252/73 |
| 3,429,816 | 2/1969 | Giolito et al. | 252/52 R |
| 3,888,777 | 6/1975 | Jackson et al. | 252/73 |
| 3,905,942 | 9/1975 | Takekoshi et al. | 528/179 |
| 3,907,696 | 9/1975 | Jackson et al. | 252/73 |
| 3,931,028 | 1/1976 | Jackson et al. | 252/73 |
| 3,966,626 | 6/1976 | Jackson et al. | 252/73 |
| 4,239,638 | 12/1980 | Beretta et al. | 252/73 |
| 4,281,637 | 8/1981 | Wilson | 126/443 |
| 4,649,903 | 3/1987 | Takeuchi et al. | 126/443 |
| 4,820,868 | 4/1989 | Mitamura et al. | 562/482 |

FOREIGN PATENT DOCUMENTS

| | | |
|---|---|---|
| 226154 | 8/1985 | Fed. Rep. of Germany . |
| 8907634 | 8/1989 | PCT Int'l Appl. . |
| 1438746 | 3/1976 | United Kingdom . |

OTHER PUBLICATIONS

Blake et al., "Thermal Stability as a Function of Chemical Structure", *Chem. Eng. Data*, vol. 6, pp. 87–98, 1961.

Johns et al., "Thermal Stability of Organic Compounds", *I & EC Product Research and Development*, pp. 2–6, 1962.

Bozhko et al., *Izv. Vysoh. Ueheb. Zaved. Mashinostr*, vol. 6, pp. 150–154, 1968.

Sevast'yanov et al., "Thermal and Radiation Stability of Several Aromatic Compounds", *At. Energ.*, vol. 14, pp. 555–558, 1963.

Primary Examiner—Paul Lieberman
Assistant Examiner—Christine A. Skane
Attorney, Agent, or Firm—Raymond C. Loyer

[57] ABSTRACT

A heat transfer fluid which maintains a low hydrogen permeation rate at temperatures of 350°–400° c. or higher and its pumpability at temperatures of −10° C. or lower is provided. The fluid is especially useful in solar energy collection applications. A method of reducing fluid impurities from polyphenyls is also disclosed.

6 Claims, 6 Drawing Sheets

HEAT TRANSFER FLUIDS

Prior Application

This is a continuation of application Ser. No. 280,601, filed Dec. 8, 1988, which is a continuation-in-part of application Ser. No. 160,554, filed Feb. 25, 1988, now abandoned.

Background of the Invention

1. Field of the Invention

The present invention relates to heat transfer fluids having a broad temperature range of use. More particularly, the present invention relates to a fluid mixture of a plurality of aryl compounds and/or polyaryl compounds having outstanding stability at high temperatures of use while also possessing excellent fluidity characteristics at low temperatures. While these characteristics are generally desirable in heat transfer applications, they are particularly valuable in solar energy applications. A method of using such a fluid for solar energy use purposes is also within the purview of the present invention.

Because the supply of fossil fuels is finite and also the increasing cost of, there has been considerable interest in developing alternate sources of energy for use in electric power stations and the like. One of the alternate energy sources is solar energy. A technique currently employed with solar energy is to collect the sun's energy using reflective surfaces to focus sunlight onto tubes, through which is flowing a heat transfer fluid. The sun's energy is then transferred by the heat transfer fluid to a power generation portion of the plant. The heat transfer fluid for solar applications must have certain properties for successful use. These properties include excellent thermal stability at high use temperatures while retaining pumpability at low temperatures that are often encountered in the environment of the operation, good heat transfer properties, acceptability from the standpoint of environmental-health related issues and attractiveness from an economical standpoint. In addition, present-day solar energy technology requires the fluid to have acceptably low hydrogen permeation characteristics at normal use temperatures.

Hydrogen permeation is an important factor because of the need to use a vacuum jacketed conduit to efficiently capture and transfer the sun's energy with minimal loss. The fluid passes through an inner conduit. An outer conduit is made of a material which is transparent to sunlight, such as a coated glass To minimize loss of energy, a vacuum is ordinarily employed between the two conduits. Hydrogen permeation refers to the phenomenon of the passage of hydrogen through the walls of the inner conduit into the evacuated annulus, the hydrogen coming from the heat transfer fluid or water. Degradation of vacuum leads directly to less efficient gathering of solar energy and is to be minimized. Vacuum jacketed conduits are ordinarily required only in portions of the application where solar collectors are encountered. Thus, return lines from solar collectors to power generation blocks and from power generation blocks back to the solar collectors can be insulated with more conventional materials.

Thus, sun rays focussed by the use of a curved reflective surface penetrate the outer conduit, move efficiently through the annulus and heat the inner conduit through which flows the heat transfer fluid. In addition to using vacuum jacketed conduits, materials of construction can have a bearing on the extent of hydrogen permeation. Stainless steels are a suitable material from which to construct the inner conduit of the solar energy collector which is exposed to high temperatures of about 300-400 degrees centigrade or higher. Since hydrogen permeation increases with increasing temperatures, less costly materials of construction can be used for system parts at lower temperatures. For example, conduits carrying fluids at lower temperatures can be made from carbon steels.

For efficient collection of solar energy, the preferred location of the installation will have a maximum number of sun-filled hours in a day and during the year. Obviously, desert areas are often selected Temperatures encountered by solar energy collection plants in deserts extend over a wide range. For example, the temperature of the heat transfer fluid can reach 400° C., or even higher, while the plant can encounter ambient temperatures as low as about −20° C. Thus, a heat transfer fluid for a solar application must function over extremes of temperature; that is, a suitable fluid should have excellent thermal stability and a low hydrogen permeation at high temperatures while remaining pumpable at low temperatures. Most known heat transfer fluids do not have the desired fluidity over such a wide temperature range. For example, many fluids which have suitable low temperature characteristics degrade excessively at the high temperatures of use or have excessively high rates of hydrogen permeation. Fluids which are acceptable for use at the higher temperatures of operation unfortunately do not remain pumpable at lower temperatures of operation. Excessive solids may precipitate and/or the viscosity of the known fluids may become too high.

2. Description of the Prior Art

Many heat-stable fluids having a rather wide temperature range of suitable flow characteristics have been disclosed. However, the known fluids have inherent limitations for use in conventional heat transfer applications involving the temperature extremes, such as encountered in solar collecting devices. When the requirement of low hydrogen permeation is added, none of the previously disclosed compositions are totally satisfactory.

For example, it has been previously suggested in U.S. Pat. No. 3,966,626 to use the components of the binary eutectic of biphenyl and diphenyl oxide in admixture with polyphenyl ether. Mixtures of biphenyl and diphenyl oxide have good thermal stability but have a melting point only as low as 12° C.

The ternary compositions, however, can have lower melting points Likewise, U.S Pat. No. 3,931,028 suggests the use of monomethyl biphenyl or monoethyl biphenyl and diphenyl oxide mixtures.

Other three or more component mixtures containing biphenyl and diphenyl oxide are disclosed in U.S. Pat. Nos. 3,907,696 and 3,888,777. Also, it is known to employ other blend components with biphenyl and diphenyl oxide to obtain lower melting mixtures. For example, Therminol 60 and Therminol 66 (marks of products of Monsanto Company) admixtures can achieve melting points below 0° C. Therminol 60 is a mixture of mono- and poly-benzylated ethyl benzenes. It is generally not employed in fluids which must withstand operating temperatures substantially above 315° C. Therminol 66 is a complex mixture of partially hydrogenated terphenyls and quaterphenyls. The average degree of hydrogenation is about 45%. Therminol 66 is generally not employed at temperatures substantially above about 357° C. The fluids of the present invention, on the other hand, are useful at temperatures of 350°-400° C., and even higher. As with the compositions disclosed in the cited U.S. patents, while being adequate for some heat transfer applications, these blends do not possess the appropriate composite of properties required for more severe heat transfer applications. In particular, the previously known compositions do not possess 350°-400° C. use stability coupled with low temperature pumpability and further coupled with acceptable hydrogen permeation behavior.

SUMMARY OF THE INVENTION

In accordance with this invention there is provided heat transfer fluids comprising mixtures of aryl compounds, said compounds having from 2 to 5 phenyl groups and having a Hydrogen Permeation Rate of less than $6 \times 10^{-4}$ torr/hr cm$^2$ as measured by the Hydrogen Permeation Test described below. In the preferred embodiment, the phenyl groups in the aryl compounds are free of or substantially free of alkyl substitution. The polyphenyl groups are typically joined directly together either by single carbon-carbon bonds or fused ring or through ether linkages.

The mixtures of aryl compounds provide new and useful heat transfer fluids with an excellent balance of thermal properties. Depending upon the particular blend, properties of these mixtures include stability at use temperatures of 350°-400° C. or higher, for example, up to 425° C., with pumpability at temperatures of $-10°$ C. or even lower. The fluids of the present invention are characterized by low hydrogen permeation as determined by the Hydrogen Permeation Test. At the upper end of the use temperature range noted above they are especially attractive for applications where low hydrogen generation (and lower hydrogen permeation) requirement is important. One specific application requiring the low hydrogen permeation of the fluids of the present invention is in solar energy collecting application employing concentric conduits having a vacuum annulus. The present invention also provides a method of using the new fluids in solar heat exchange systems.

The present heat exchange fluids have freezing points as defined herein as low as $-10°$ C. without solids being formed. The fluids are useable at even lower temperatures and yet retain their pumpability since crystal formation in the $-10°$ C. to $-15°$ C. temperature range is usually minimal and the fluid remains pumpable. Each heat transfer application will define what constitutes a pumpable fluid; but about 2,000 cSt is often used for defining the limit of pumpability. Thus, a fluid having a viscosity of more than 2,000 cSt does not have the required pumpability. Some solids can be present and the particular application will define the amount of solids which can be tolerated. Fluids of the present invention maintain their pumpability at temperatures of $-10°$ C. or lower.

A host of minor impurities are introduced during the manufacture of the aryl heat transfer fluids of this invention. Even after distillation the desired aryl blend components of the present invention generally are not sufficiently free of these impurities for optimal use in the products of the present invention. Further purification of the components is usually required. Diphenyl oxide is an important component of many fluids of this invention. It has been found that diphenyl oxide can be obtained with impurity levels of 10-100 ppm by very careful fractional distillation. However, distillation alone is not sufficient to reduce impurities to required levels in the other operable aryl compounds. Two alternative methods for purifying the other aryl compounds are disclosed herein. The first general procedure involves fractional distillation followed by recrystallization of the subject compounds. The second method involves selective oxidation of unwanted impurities and subsequent destruction and removal of unwanted material from the desired (unmodified) aryl fluids of this invention.

DETAILED DESCRIPTION OF THE INVENTION

Typical examples of aryl compounds included in the fluids of this invention are phenylethers represented by the formula

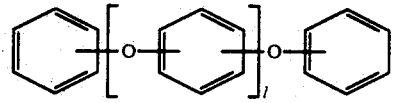

wherein 1 is an integer of from 0 to 3; polyphenyls represented by the formula

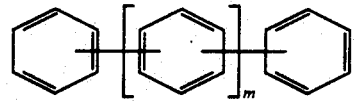

wherein m is an integer of from 0 to 2; substituted and naphthalenes represented by the formula

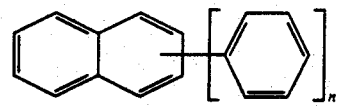

wherein n is an integer of 0 to 2; and other aryl compounds such as naphthalene, phenanthene and dibenzofuran.

Operable fluids of this invention are mixtures of aryl compounds described above in many combinations. Such mixtures provide fluids, many of which remain liquid at temperatures of $-15°$ C. or even lower. Examples of fluids within the scope of this invention are listed below with percentage composition in weight percent. Those fluids meeting the $-15°$ C. liquidity requirement are designated with asterisks.

| Fluid Component | a | b | c | d | e* | f* | g* | h | i* | j* |
|---|---|---|---|---|---|---|---|---|---|---|
| biphenyl | 30 | | | | 10.7 | 7.7 | 15.5 | 10.7 | | |
| diphenyl oxide | 70 | | | | 24.0 | 27.7 | 35.5 | 23.3 | 23.3 | 23.3 |

-continued

| Fluid Component | a | b | c | d | e* | f* | g* | h | i* | j* |
|---|---|---|---|---|---|---|---|---|---|---|
| terphenyl | | | | | | | | | | |
| ortho- | | 70 | | | | 17.7 | | 23.8 | 23.8 | 23.8 |
| meta- | | 20.5 | | | | 5.1 | | 7.0 | 7.0 | 7.0 |
| para- | | 1.5 | | | | .3 | | .5 | .2 | .2 |
| phenoxybiphenyl | | | | | | | | | | |
| ortho- | | | 6.9 | | 4.0 | 1.7 | 3.5 | 2 | 2 | 2 |
| meta- | | | 75.9 | | 50 | 19.0 | 37 | 25 | 25 | 25 |
| para- | | | 17.2 | | 11.3 | 4.3 | 8.5 | 5 | 5 | 5 |
| diphenoxybenzene | | | | | | | | | | |
| ortho- | | | | 2 | | .3 | | | | |
| meta- | | | | 65 | | 16.3 | | | | |
| para- | | | | 33 | | 7.9 | | | | |
| Phenanthrene | 8 | | | | | 2 | | 2.7 | 3 | 3 |
| dibenzofuran | | | | | | | | | | 10.7 |
| napthalene | | | | | | | | | 10.7 | |

*denotes that fluid remained non-crystalline at −15° C.

Fluids of this invention having both desired hydrogen permeation characteristics as well as low temperature fluidity will ordinarily contain both biphenyl and diphenyl oxide in order to impart low temperature properties. This binary mixture, however, is not sufficient to impart the desired low temperature properties because the lowest melting binary mixture of biphenyl and diphenyl oxide melts at +12° C. Thus, preferred fluids will contain major amounts of additional components such as o-terphenyl, m-terphenyl, o-phenoxybiphenyl, m-phenoxybiphenyl, p-phenoxybiphenyl, o-diphenoxybiphenyl, m-diphenoxybiphenyl, p-diphenoxybiphenyl, phenanthrene, dibenzofuran or napthalene.

A preferred fluid of the present invention comprises a quaternary mixture on a weight basis of from about 5% to about 30% biphenyl, from about 25% to about 75% diphenyl oxide, from about 10% to about 50% o-terphenyl and from about 5% to about 25% m-terphenyl.

Other preferred fluids of the present invention comprise a quaternary mixture of from about 5% to about 30% biphenyl, from about 25% to about 75% diphenyl oxide, from about 10% to about 50% m-phenoxybiphenyl and from about 5% to about 25% p-phenoxybiphenyl.

Other preferred fluids of the present invention comprise a quaternary mixture of about from 5% to about 30% biphenyl, from about 25% to about 75% diphenyl oxide, from about 10% to about 50% m-diphenoxybenzene and from about 5% to about 25% p-diphenoxybenzene.

Other preferred embodiments of the present invention comprise a quaternary mixture of from about to about 30% biphenyl, from about 25% to about 75% naphthalene, from about 10% to about 50% o-terphenyl and from about 5% to about 25% m-terphenyl.

Particularly preferred embodiments of the present invention involve more specific ranges of each of the quaternary components. Specifically, biphenyl will be in the range of from about 5% to about 15%, diphenyl oxide in the range of from about 45% to about 75%, o-terphenyl in the range of from about 15% to about 45% and m-terphenyl in the range of from about 5% to about 20%.

Similarly, other particularly preferred embodiments of the present invention will contain biphenyl in the range of about 5% to about 15%, diphenyl oxide in the range of 45% to about 75%, m-phenoxybiphenyl in the range of about 15% to about 45% and p-phenoxybiphenyl in the range of about 5% to about 20%.

Yet other particularly preferred embodiments of the present invention will contain biphenyl in the range of from about 5% to about 15%, diphenyl oxide in the range of from about 45% to about 75%, m-diphenoxybenzene in the range of from about 15% to about 45% and p-diphenoxybenzene in the range of from about 5% to about 20%.

Still another particularly preferred embodiment of the present invention will contain biphenyl in the range of from about 5% to about 15%, napthalene in the range of from about 45% to about 75%, o-terphenyl in the range of from about 15% to about 45% and m-terphenyl in the range of from about 5% to about 20%.

In the description of the invention herein all percentages are by weight unless otherwise specified.

In all cases, the quaternary mixtures may be augmented with additional components selected from any compounds listed above. In accordance with this invention, each fluid component is sufficiently free from impurities which can lead to hydrogen permeation in excess of that desired.

Thus, operable fluids of the present invention can be further defined as having low hydrogen permeation rates as measured by the Hydrogen Permeation Test described herein. Generally, in order to perform satisfactorily in applications requiring limiting (high) hydrogen permeation rates, e.g., solar applications employing vacuum jacketed solar collectors, fluids of the present invention will have such rates of less than about $6 \times 10^{-4}$ 1-torr/hr-cm$^2$ by the Hydrogen Permeation Test when measured at temperatures of 388° to 393° C., system pressures of about 1,746.7 k Pa, water present at about 300 ppm and with system flows of about 60 gallons per minute. Hydrogen permeation values will be affected by each of the system variables. In addition, the materials of construction will have an effect. For example, the limiting useful permeation value cited above was determined with 304 stainless steel having a wall thickness of 0.8 mm. In addition, permeation values may rise with time; i.e., in closed systems the measured hydrogen permeation rates will increase. Thus, in order to gain perspective on the quality of a fluid it is useful to employ a reference fluid. Therminol VP-1, a eutectic mixture of biphenyl and diphenyl oxide can be employed for this purpose. The hydrogen permeation rate value is shown in FIGS. 1 and 2 of the present specification It can be seen that for all three levels of fluid impurities tested that the hydrogen permeation rate is less than about $6 \times 10^{-4}$ 1-torr/hr-cm$^2$.

Achieving low levels of hydrogen producing impurities in the fluid is an important aspect of the present invention. The hydrogen permeation rate will generally increase as the impurity content of the fluid increases, particularly if the impurity-types constitute aromatic or poly-aromatic compounds containing alkyl substituents. In addition, the choice of aryl or polyaryl compounds chosen in making up the multi-component blends of the present invention will determine in part the lowest hydrogen permeation rate possible. At the reference set of conditions cited above for the Hydrogen Permeation Test, the permeation rate can be as low as $6 \times 10^{-6}$ 1-torr/hr-cm$^2$. Typical values for the suggested reference fluid, Therminol VP-1, can be as low as $3 \times 10^{31 5}$ 1torr/hr-cm$^2$.

Thus, operable fluids are further defined as having low hydrogen permeation rates as measured by the Hydrogen Permeation Test described herein. When measured at temperatures of 388° C. to 393° C. and 14.801 x $\times 10^5$N the permeation rate can be as low as $6 \times 10^{31\ 6}$ 1-torr/hr-cm$^2$ through 304L stainless steel tubing (wall thickness of 0.8 mm). This value is achieved by minimizing hydrogen producing impurities in the fluid mixture. The maintenance of a low level of hydrogen producing impurities in the fluid is an important aspect of the present invention. The permeation rate will generally increase as the impurity content of the fluid increases, particularly if the impurity-types constitute aromatic or poly-aromatic compounds containing alkyl substituents. For example, the low hydrogen permeation rate cited above is achievable with total alkyl aryl impurities of about 100 ppm.

More generally, the fluids of the present invention will have hydrogen permeation rates of less than about $6 \times 10^{-4}$ 1-torr/hr-cm$^2$ by the Hydrogen Permeation Test. This hydrogen permeation rate will be achieved with impurity contents of about 2,000 ppm or less with traces of water present up to about 300 ppm.

There are described below general procedures for the preparation of many components of the fluids of the present invention although other procedures may be employed. Further, these and other components may be prepared by known methods for use in the processes and compositions of this invention.

The components of the fluids of the present invention can be manufactured using known high temperature conversion processes. For example, biphenyl can be manufactured by passing benzene through high-nickel alloy tubes which are heated to temperatures as high as 800° C. The benzene is converted to biphenyl and higher polyphenyls. The reaction product is controlled by recycle of varying amounts of prior product. The amount of polyphenyls being recycled will depend on the split of biphenyl to high polyphenyls desired. For example, the more terphenyl desired, the higher the amount of biphenyl which will be recycled. The desired individual polyphenyls can be separated by distillation into relatively pure forms at this point in the process. In the case of the present invention, biphenyl, ortho-terphenyl and meta-terphenyl are the desired polyphenyls. The polyphenyl components in the fluids of the present invention will ordinarily be purified further in order to meet hydrogen permeation requirements as cited herein. Details of the steps taken to achieve desired purity levels are given in a subsequent section.

Diphenyl oxide can be made by passing phenol through a heated catalyst bed comprising thorium dioxide at temperatures of about 450° C. Unreacted phenol along with water are separated from the conversion products by distillation. Diphenyl oxide is a component of the fluids of the present invention. It will ordinarily have to be purified further as indicated herein in order to meet hydrogen permeation rate criteria established for the fluids of the present invention. Details of the steps taken to achieve desired purity levels are given in a subsequent section.

Dibenzofuran can be made by passing phenol over a cerium oxide catalyst at about 450° C. Unreacted phenol and water are separated from conversion products by distillation. The relatively pure dibenzofuran will ordinarily need to be purified further in order to meet the hydrogen permeation criteria established for the fluids of the present invention. Dibenzofuran is a fluid component of the present invention. Details of steps which may be taken to further purify dibenzofuran are given in a subsequent section Phenoxy biphenyls and diphenoxy benzenes can be made by Ullman technology. To one mole of the appropriate isomer mix of dichlorobenzene, the meta- and para- isomers are preferred for the fluid components of the present invention, are added moles of potassium phenate along with cuprous chloride catalyst. The mixture is heated while stirring (atmospheric pressure) to about 210° C. to 220° C. where reaction commences. After the reaction is complete, about five hours, the mixture is cooled to below 100° C. and flooded with water. The oil later contains the diphenoxy benzene which can be separated and washed with hot water. Relatively pure fluid components are then made by distilling with a small amount of metallic sodium. Details of steps taken to further purify diphenoxy benzenes, fluid components of the present invention, are given in a subsequent section.

Mono-phenoxy biphenyls can be made by Ullman technology. The mono-chloro biphenyl starting material can be a mixture of ortho-, meta and para- isomers; in this case, the meta-isomer will be about 60% or more. Details of purification steps to produce fluid components suitable for the fluids of the present invention are given in a subsequent section Other means of producing individual components of the fluids of the present invention are possible. Regardless of the means chosen to produce these fluid components, further purification may be needed. Specifically, component impurities which contribute to hydrogen permeation disproportionately to the amount of the impurity present need to be removed to levels which will enable hydrogen permeation criteria to be met.

The relatively pure fluid components of the present invention, biphenyl, o- and m-terphenyl, diphenyl oxide, dibenzofuran, diphenoxy benzene and phenoxy biphenyl will ordinarily benefit from further purification. In each of the cases to be discussed, the objective is to remove impurities which contribute to hydrogen permeation disproportionately to the amount of the impurity present. Diphenyl oxide is provided in the method described hereinabove in relatively pure form and is conveniently purified further by fractional distillation. Alkyl-diphenyl oxide content of diphenyl oxide can be reduced significantly by this method.

The amount of alkyl phenols can be reduced significantly by passage through beds of activated alumina. The resultant purified diphenyl oxide may be produced with total impurities of from about 10 to 100 parts-per-million (ppm).

The relatively pure polyphenyl-components of the fluids of the present invention can be further purified by a number of technologies. In one method relatively pure individual fluid components can be produced by fractional distillation; i.e., biphenyl can be produced as an individual fluid component, and o- and m-terphenyl can be produced with the appropriate isomer ratio. One means of removing harmful impurities in the polyphenyl fluid components is crystallization from a solvent. The solvent is chosen to leave impurities behind in solution. Suitable solvents include hexane and other low boiling paraffinic solvents. The polyphenyl is dissolved in the solvent by stirring and heating. Purified individual polyphenyl fluid components result by slowly cooling the solution. The supernatant liquid is decanted, or, alternatively, the crystals are separated by means such as filtration. After washing with solvent the crystals are dried. A final treatment, to remove solvent, involves remelting the purified polyphenyl, under vacuum if desired. Impurities in the polyphenyls can be reduced to levels of about 100 ppm by these means.

Another technique for refining polyphenyls employs a chemical oxidative treatment. This method is described in greater detail in a subsequent section. This technique is applicable to other fluid components of the present invention such as diphenoxy benzene, phenoxy biphenyl or dibenzofuran after fractional distillation. Briefly, fluid components are subjected to oxidizing conditions in the presence of an oxidation catalyst and an organic acidic catalyst. The oxidative-purification reaction can be accelerated by use of a promoter such as toluene. The reaction is conducted in the temperature range of from about 100° C. to 200° C. under an oxygen atmosphere. The oxygen pressure will be sufficiently high to be above the explosive limit for the particular reaction mixture. On completion of the oxidation reaction, minor amounts of water are stripped out and the reaction mixture is then contacted with strong base, for example metallic sodium or mixtures of potassium hydroxide-sodium hydroxide. The desired fluid components are then separated by distillation. The impurity levels achieved will depend on the reaction conditions chosen, the particular fluid components involved, and the levels of impurity of the starting reaction mixtures involved. Reduction of undesirable impurities, however, by a factor of up to about 70 can be achieved.

Regardless of the purification method chosen, the objective is to remove impurities in the fluid components to levels which will achieve the desired hydrogen permeation rate noted hereinabove.

Impurities other than the aforementioned alkyl polyphenyls or alkyl aryl ethers can be present in the fluids of the present invention. In particular, the method of manufacture of polyphenyls cited above produces significant amounts of phenanthrene, anthracene and naphthalene along with lesser amounts of fluorene and phenyl fluorenes. It has been found that these materials, when present in the ranges cited below, may result in increased hydrogen permeation rate above that for the preferred blend components. However, their contribution to increased hydrogen permeation rate may not be as severe as an equivalent weight of alkyl aromatic species. It is preferred to manage the levels of the impurities by limiting their presence in the blend components before appropriate distillation cuts. Phenanthrene is relatively innocuous from the standpoint of hydrogen permeation and may be present at about 2 to 20 percent. Phenyl naphthalene levels may be 0.2 to 5 percent. These two impurities are minor by-products in the manufacture of terphenyls as cited above. Likewise, fluorenes and phenyl fluorenes are by-products of the manufacture of polyphenyls as cited above. Fluorene-like materials are removed to sufficiently low levels by the chemical oxidation treatment outlined above.

Also, for those applications wherein the fluid of the present invention is not required to possess low hydrogen permeation rates, the requirement for extremely low impurity levels may be much less important. While moieties such as alkylated diphenyl oxides, methyl biphenyls and methyl terphenyls are usually somewhat less stable than the unsubstituted blend components, their contribution to thermal degradation in many applications is much less important than their contribution to enhanced hydrogen permeation rates in solar or other applications where generation of even trace amounts of hydrogen is important.

Hydrogen Permeation Test

A schematic of the Hydrogen Permeation Test loop is described below with reference to FIG. 4. To make a hydrogen permeation measurement, the space between a glass jacketed collector tube and the tube itself is evacuated. The evacuated jacket is closed off and the pressure rise, due to hydrogen, is measured with a capacitance manometer. This is the torr/hr portion of the units used to describe hydrogen permeation in units of 1-torr/hr-cm$^2$. Next, the valve isolating the vacuum pumps from the collector jacket is opened and a portion of the gaseous contents of the jacket is sampled to a mass spectrometer through a variable leak valve. The mass spectrometer is used to measure the purity of the gas collected in the vacuum jacket; i.e., the measurement confirms that only hydrogen is present in the jacket during the permeation measurements and that the pressure rise recorded was not due to leaks, etc. If less than 100% hydrogen, this percentage is used (in decimal format) to multiply the pressure rise. The final recorded number for permeation is then obtained by multiplying the pressure rise by the volume of the jacket (2.392 liters) and the inverse of the cross sectional area of the inner metal tube of the jacket (1,087.7 cm$^2$). The time of the measurement, the temperature of the fluid at the collector, and the system pressure complete the data recorded at any particular measurement of permeation.

The above-described Hydrogen Permeation Test is employed in commerce to provide a standard test by which candidate heat transfer fluids are qualified. (Kawasaki Thermal Systems, Tacoma, Wash.).

Fluid Purification Processes

The present invention also provides a method of reducing hydrogen generating impurities from a fluid mixture of polyphenyls, such as a mixture of o-terphenyl and m-terphenyl. When hydrogen generating precursers are present in the fluid mixtures in excess of about 2000 ppm and when the fluid mixture is to be used for solar energy application, the presence of such impurities appreciably increases the hydrogen permeation rate of the fluid mixture to an undesirable extent. The reduction in fluid impurities in the polyphenyl mixture is accomplished by subjecting the fluid mixture to oxidizing conditions in the presence of oxygen, an oxidation catalyst, and an organic acid. The oxidation step is preferably carried out at elevated temperatures in the presence of molecular oxygen. Temperatures of about 100°–200° C., preferably about 160° C. are normally suitable. The oxidation step is carried out at atmospheric or slightly elevated pressure. For example pressure in the range of about $6.89 \times 10^5$ N has been found to be satisfactory. A preferred metal catalyst is a mixture of cobaltous bromide and Ce(III) acetate or cobaltous bromide alone. In practice, cobalt ions may be introduced by means of a variety of compounds which provide cobalt ions in solution. For example, compounds such as cobalt acetate, cobalt chloride, lower alkanoic acid salts such as cobalt acetate, etc. Also the bromide ion may be introduced by means of a variety of compounds which provide bromide ion under reaction conditions. For example, bromide ion may be provided by soluble forms of cerous bromide, lower alkanoic acyl bromide such as acetyl bromide, benzyl bromide, methylene dibromide and sodium bromide. Improved results are obtained by the presence of cerium ions which may be provided in various forms such as cerium acetate, cerium chloride or any suitable compounds providing cerium ions under reaction conditions. The organic acid catalyst substance includes propionic acid, propionic acid anhydride, acetic acid, acetic acid anhydride, butyric acid, valeric acid, hexanoic acid, octanoic acid and decanoic acid, and mixtures thereof. Hexanoic acid is generally preferred. Following the oxidation step the acid and water of reaction are stripped from the polyphenyl mixture by conventional distillation. The resulting polyphenyl mixture containing fragments from the oxidation step is brought into reactive contact at an elevated temperature with a strongly basic substance. Suitably strong bases include sodium hydroxide and/or potassium hydroxide or metallic sodium. Treatment with strong base destroys or renders nonvolatile the oxidized impurities. The desired polyphenyl can then be separated in highly pure form from the balance of the reaction mixture by conventional distillation.

It has been found that greater reduction of oxygen producing impurities is obtained when the oxidation step is carrid out in the presence of a promoter. A promoter is an easily oxidized organic substance that undergoes oxidation under the conditions of the reaction. Typically, an organic promoter is an $C_{1-3}$ alkyl substituted aryl compound such as toluene, xylene, mesitylene, ethyl benzene, etc. the promoter is added to the oxidation reaction mixture in the amount of up to about 5% by weight of total fluid and most usually in the amount of from about 0.1% to about 3%, by weight. In most instances, addition of a promoter in an amount of about 2%, by weight, is preferred. Because of its availability, toluene is preferred. The promoter is easily oxidized and initiates the oxidation of other oxidizable materials in the reaction mixture.

A BRIEF DESCRIPTION OF THE DRAWINGS

DETAILED DESCRIPTION OF THE DRAWINGS

Figure 1:
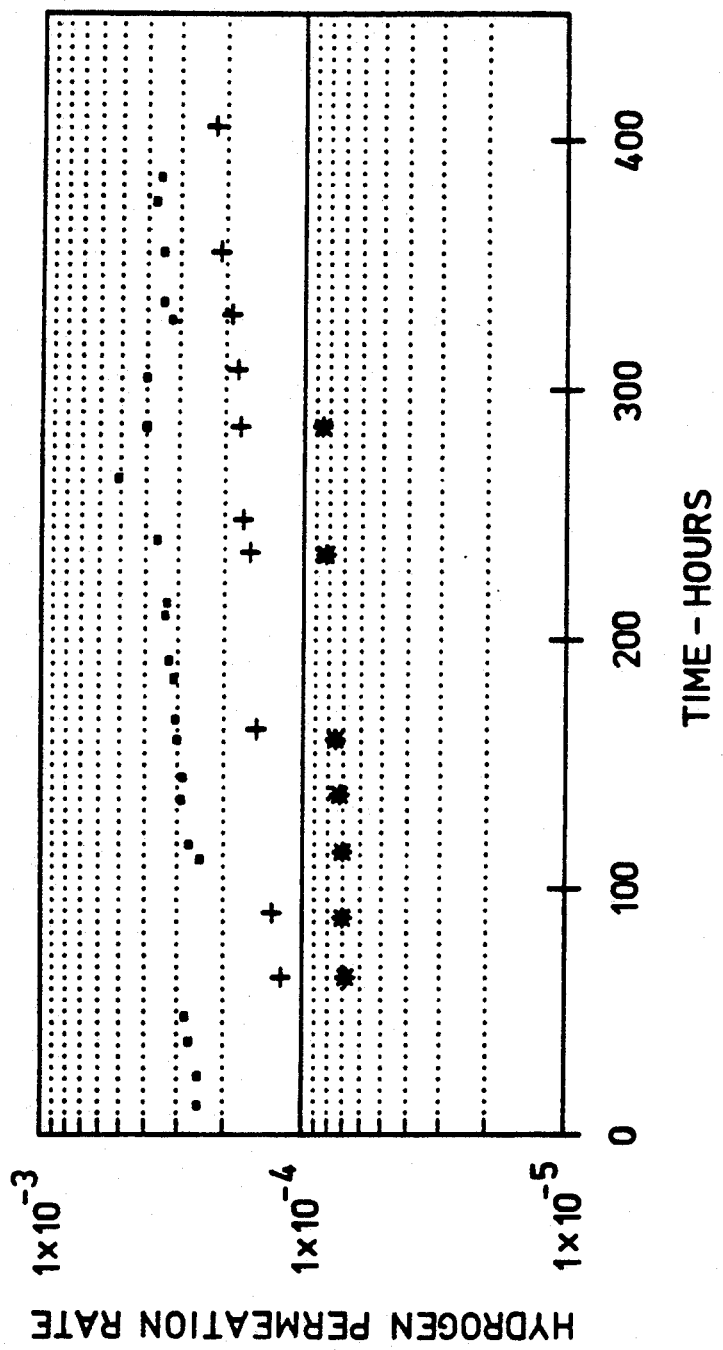
FIG. 1 is a plot of the log of the hydrogen permeation rate versus time as a function of the total impurity content in the binary eutectic composition of biphenyl and diphenyl oxide.

With reference to FIG. 1, the composition, whose hydrogen permeation rates are given as a function of time, is an eutectic mixture of 26.5% biphenyl and 73.5% diphenyl oxide. Such mixtures are commercially available under the name Therminol VP-1. A eutectic composition is the lowest melting composition and is characterized by the liquid and solid at this composition being equivalent in makeup. Total impurity content is in parts-per-million (ppm) level, the permeation rate is in liter-torr-per-hour-square centimeter (1-torr/hr-cm$^2$). The level of undersired cent impurities content was measured by a combination of gas chromatography and mass spectrometry (G.C./M.S.)

Permeation rate is the pressure rise (in torr) per hour measured in the closed-evacuated space of the solar collector (FIG. 4), this value times the volume of the evacuated space (in liters), then multiplied by the inverse of the cross sectional area of the inner metal conduit of the collector (in cm$^2$).

The data shown were obtained with the heat transfer Loop (FIG. 4) isolated from the expansion tank. For example, with the expansion tank part of the circulating loop, lower permeation values would be obtained.

Figure 2:
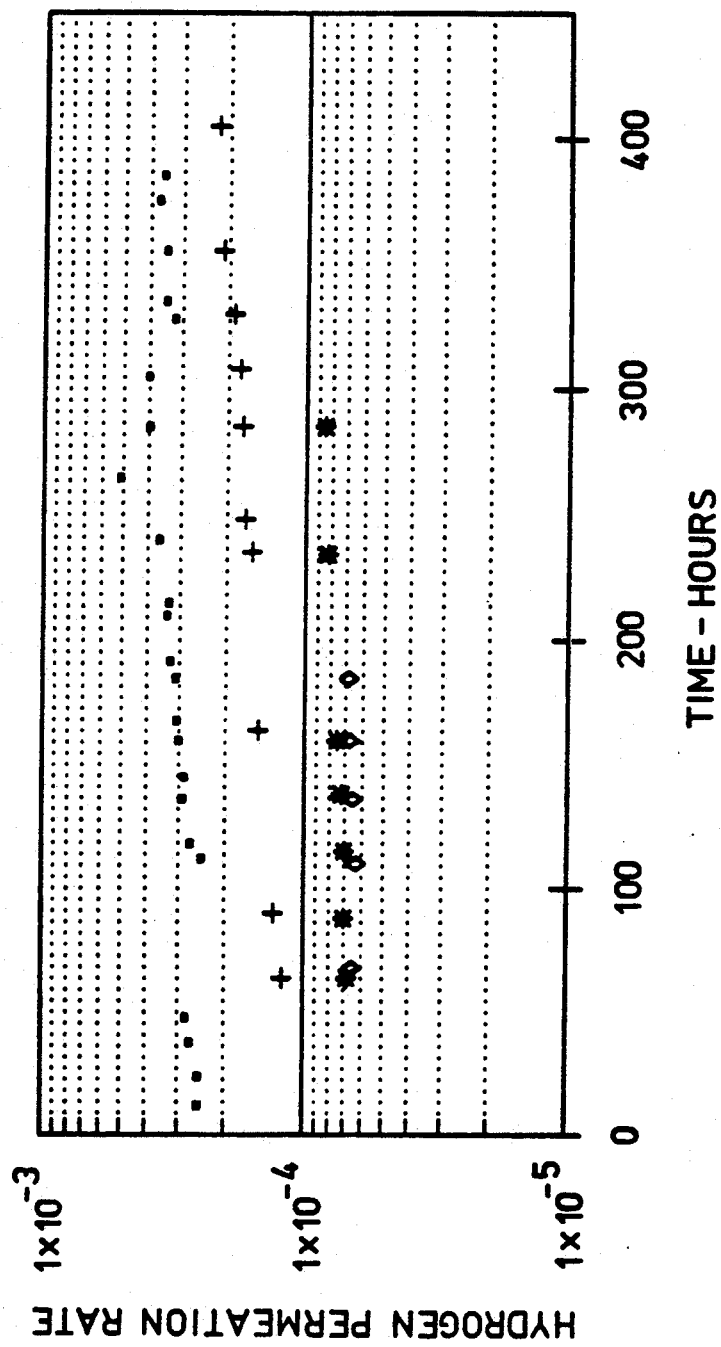
FIG. 2 is the plot of FIG. 1 data including a plot of the log of the hydrogen permeation rate for a quaternary mixture of diphenyloxide, biphenyl, ortho-terphenyl and meta-terphenyl.

With reference to FIG. 2, the data from FIG. 1 are included for comparison purpose. The quaternary composition illustrated is Fluid No. 3 of Example 1. The total impurity content of this fluid was found to be 130 ppm.

Figure 3:
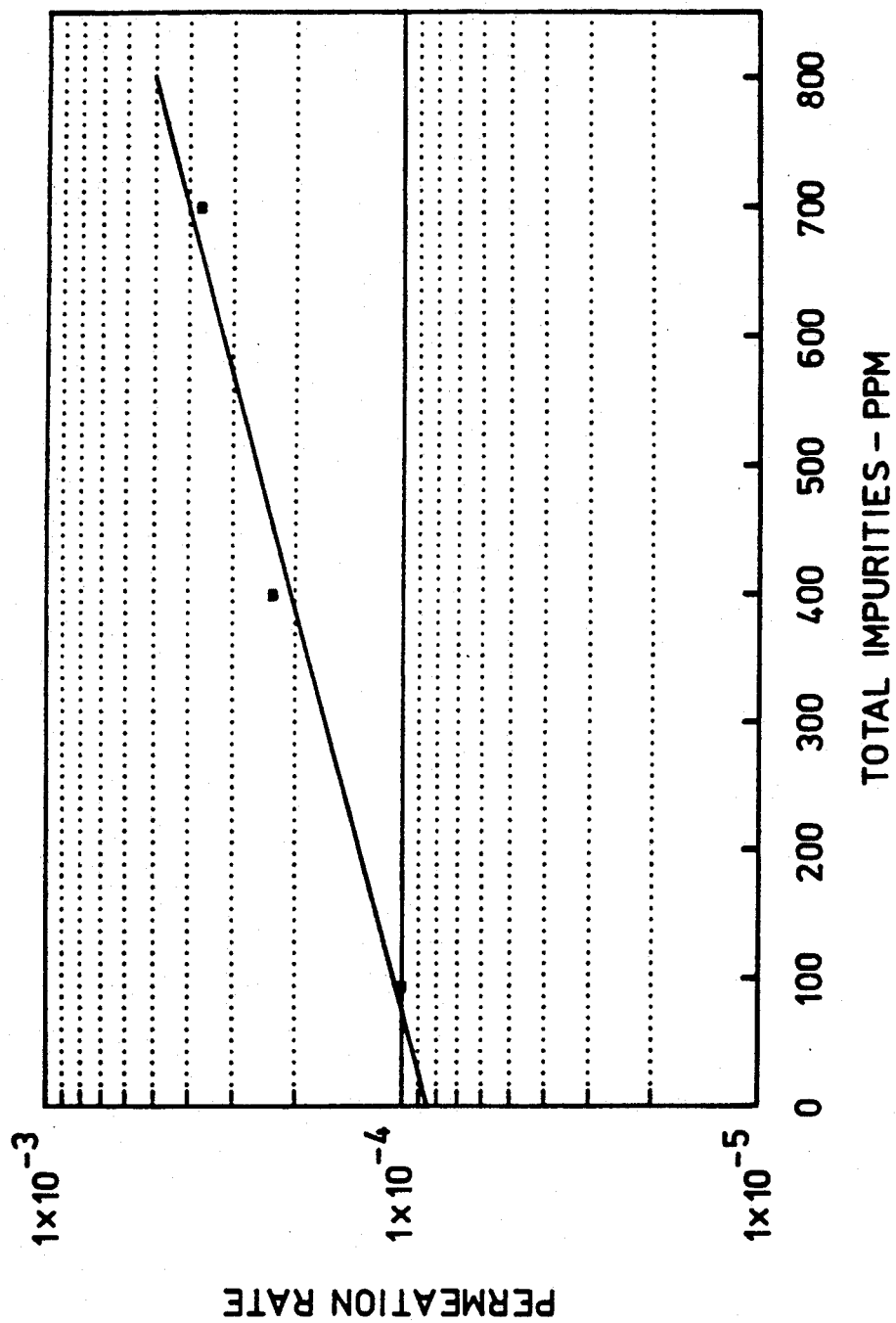
FIG. 3 is a replotting of the data of FIG. 1 showing the influence of fluid-purity on hydrogen permeation rate.

With reference to FIG. 3, the plotted permeation data were taken for each of the fluids in FIG. 1 at 400 hours and replotted versus fluid impurity content.

Figure 4:
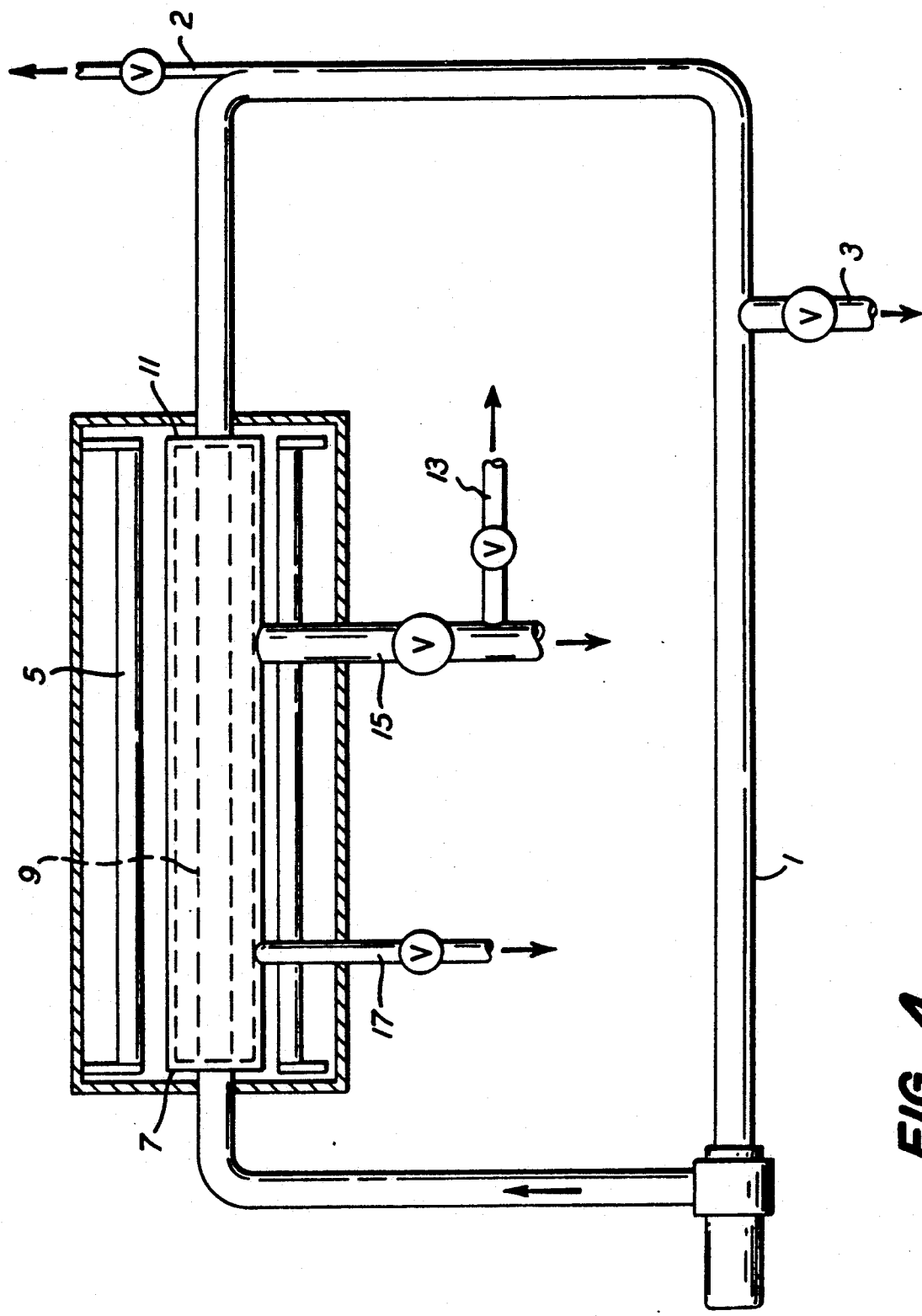
FIG. 4 is a schematic view in partial cross section of the test apparatus used to measure hydrogen permeation by the Hydrogen Permeation Test.

With reference to FIG. 4, where the test apparatus used to measure hydrogen permeation by the Hydrogen Permeation Test is shown, a heat transfer fluid is pumped continuously around a closed loop system. The system (1) pressure is maintained at 1,746.7 kilo-pascals, (k-Pa) by the use of the accumulator system through conduit 3 and expansion tank through conduit 2. Temperatures are maintained at 388°-393° C. with suitable power controllers directing power to a plurality of halogen lamps 5 which heat the fluid being circulated in the closed loop. The volume of the loop is 16.9 liters. The collector comprises a light permeable coated glass shell 7, (outer tube) sealed through a bellows assembly to a 304L stainless steel pipe. Dimensions of the inner pipe 9 are 42.5 mm (O.D.), 0.8 mm wall thickness. The volume of the evacuated space 11 is 2.392 liters and the cross sectional area of the stainless steel pipe 9 in the jacket portion is 1,087.7 cc. In order to provide an analysis of the gases which accumulate in the evacuated annulus over a period of time, a conduit 13 leading to a mass spectrometer is provided. The vacuum in jacket eleven (11) is maintained by a vacuum system through conduit fifteen (15) and monitored by a capacitance monometer through conduit seventeen (17).

DESCRIPTION OF THE PREFERRED EMBODIMENTS

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only with the scope and spirit of the invention being indicated by the claims which follow the examples.

In the examples all weights are given on a weight basis unless otherwise indicated.

EXAMPLE 1

Mixtures of biphenyl, biphenyl oxide, orthoterphenyl and meta-terphenyl were prepared in the proportions shown in Table 1 below.

TABLE 1

| Fluid | Composition (%) | | | |
|---|---|---|---|---|
| No | biphenyl | diphenyl oxide | o-terphenyl | m-terphenyl |
| 1 | 21.2 | 58.8 | 15.0 | 5.0 |
| 2 | 18.6 | 51.4 | 22.5 | 7.5 |
| 3 | 15.9 | 44.1 | 30.0 | 10.0 |
| 4 | 13.2 | 36.8 | 37.5 | 12.5 |
| 5 | 10.6 | 29.4 | 45.0 | 15.0 |
| 5a | 9.2 | 60.0 | 21.2 | 9.6 |

In each of the above compositions the ratio of o-terphenyl to m-terphenyl is about 3:1, by weight. The biphenyl and diphenyl oxide of each of the compositions are present in the eutectic mixture of 73.5% diphenyl oxide, 26.5% biphenyl. The purities of the individual components are given in Table 2 below.

TABLE 2

| Blend Component | Purity (%) | Impurities (ppm) |
|---|---|---|
| biphenyl | 99.977 | 230 |
| diphenyl oxide | 99.997 | 30 |
| o-terphenyl | 99.987 | 130 |
| m-terphenyl | 99.977 | 230 |

Major impurities in biphenyl included naphthalene at 45 ppm, 2-methyl biphenyl at 40 ppm, diphenyl methane at 15 ppm, 3-methyl biphenyl at 138 ppm, and 4-methyl biphenyl at 37 ppm. Major impurities in diphenyl oxide included 3,4,5-trimethyl phenol, biphenyl and 2-methyl diphenyl oxide.

Major impurities in the o-terphenyl included methyl terphenyls and phenyl fluorenes.

Major impurities in the m-terphenyl included methyl terphenyls and phenyl fluorenes.

EXAMPLE 2

Mixtures of biphenyl, diphenyl oxide, orthoterphenyl and meta-terphenyl were prepared in the proportions shown in Table 3 below.

TABLE 3

| Fluid No. | Composition (%) | | | |
|---|---|---|---|---|
| | Biphenyl | Diphenyl Oxide | Orth-Terphenyl | Meta-Terphenyl |
| 6 | 23.18 | 25.00 | 35.62 | 16.20 |
| 7 | 21.63 | 30.00 | 33.25 | 15.12 |
| 8 | 20.08 | 35.00 | 30.88 | 14.04 |
| 9 | 18.54 | 40.00 | 28.50 | 12.96 |
| 10 | 17.00 | 45.00 | 26.12 | 11.88 |
| 11 | 15.45 | 50.00 | 23.75 | 10.80 |
| 12 | 13.90 | 55.00 | 21.38 | 9.72 |
| 13 | 12.36 | 60.00 | 19.00 | 8.64 |
| 14 | 10.82 | 65.00 | 16.62 | 7.56 |

In each of the above compositions the ratio of biphenyl to ortho-terphenyl to meta-terphenyl is 30.9:47.5:21.6. This ratio is the composition of the ternary eutectic of the three materials. The purities of the individual components are the same as in Example 1.

EXAMPLE 3

Freezing point measurements were made on the mixtures of Example 1 and Example 2. Ten grams of each of the compositions were placed in glass test tubes. The test tubes were stoppered and placed in a constant temperature bath controlled to +/−0.2° C. The temperature of the bath was lowered every two days in 2.8° C. increments and observations were made. At each temperature the samples were equilibrated (several hours). Each sample was then seeded with crystals of orth-terphenyl and meta-terphenyl and left overnight. On the second day each test tube which exhibited no crystals was scratched with a glass rod and then left another 24 hours. Observations were classified in the following terms.

| | |
|---|---|
| Clear solution | no crystals |
| Minor solids | less than about 5% solids |
| Moderate solids | more than about 5% solids but substantial liquid phase still exists |
| Mostly solids | little liquid phase left |
| Solid | substantially all solid phase exists |

Figure 5:
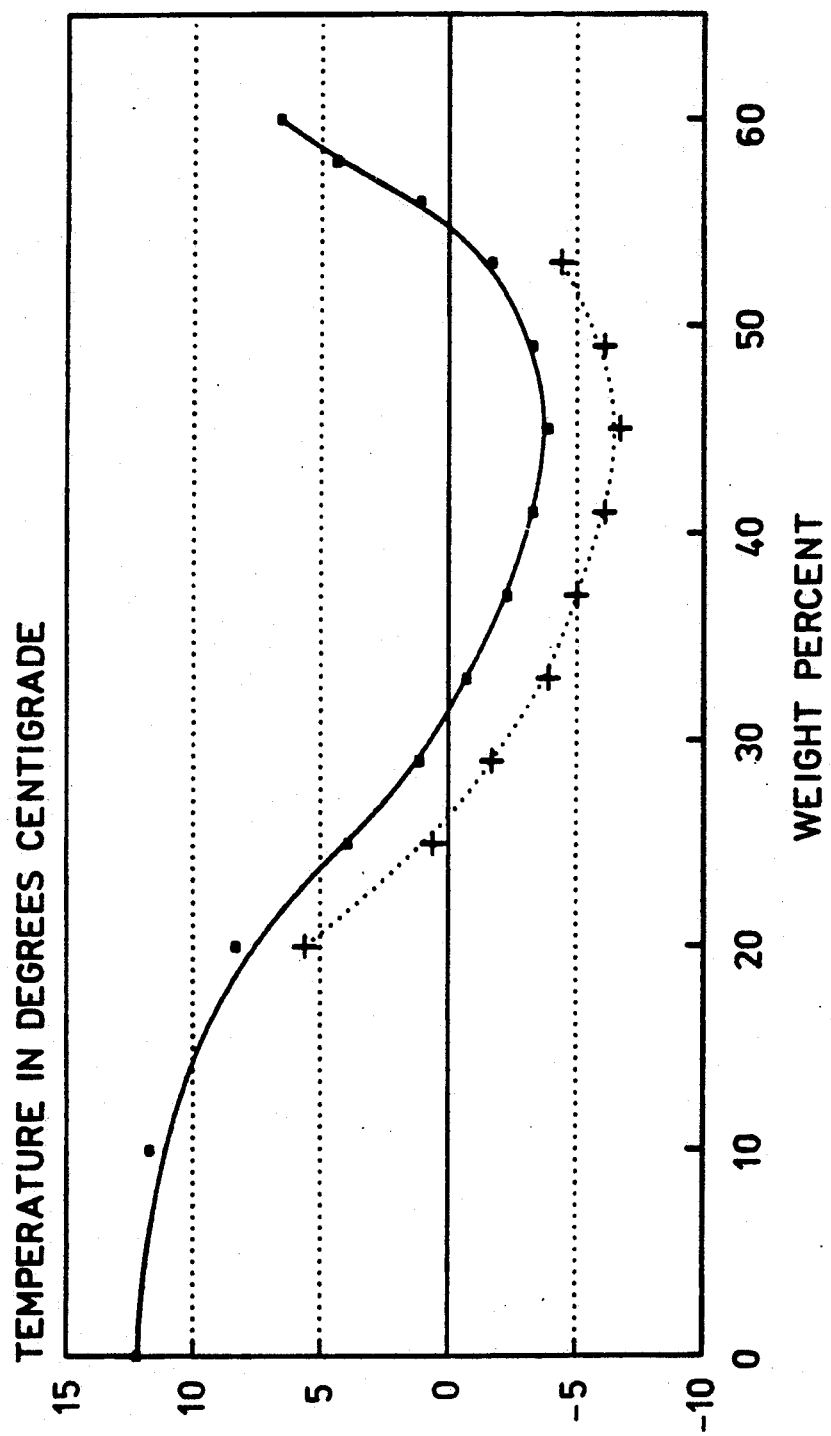
FIG. 5 shows the freezing characteristics of the fluids of Examples 1 and 5.
Figure 6:
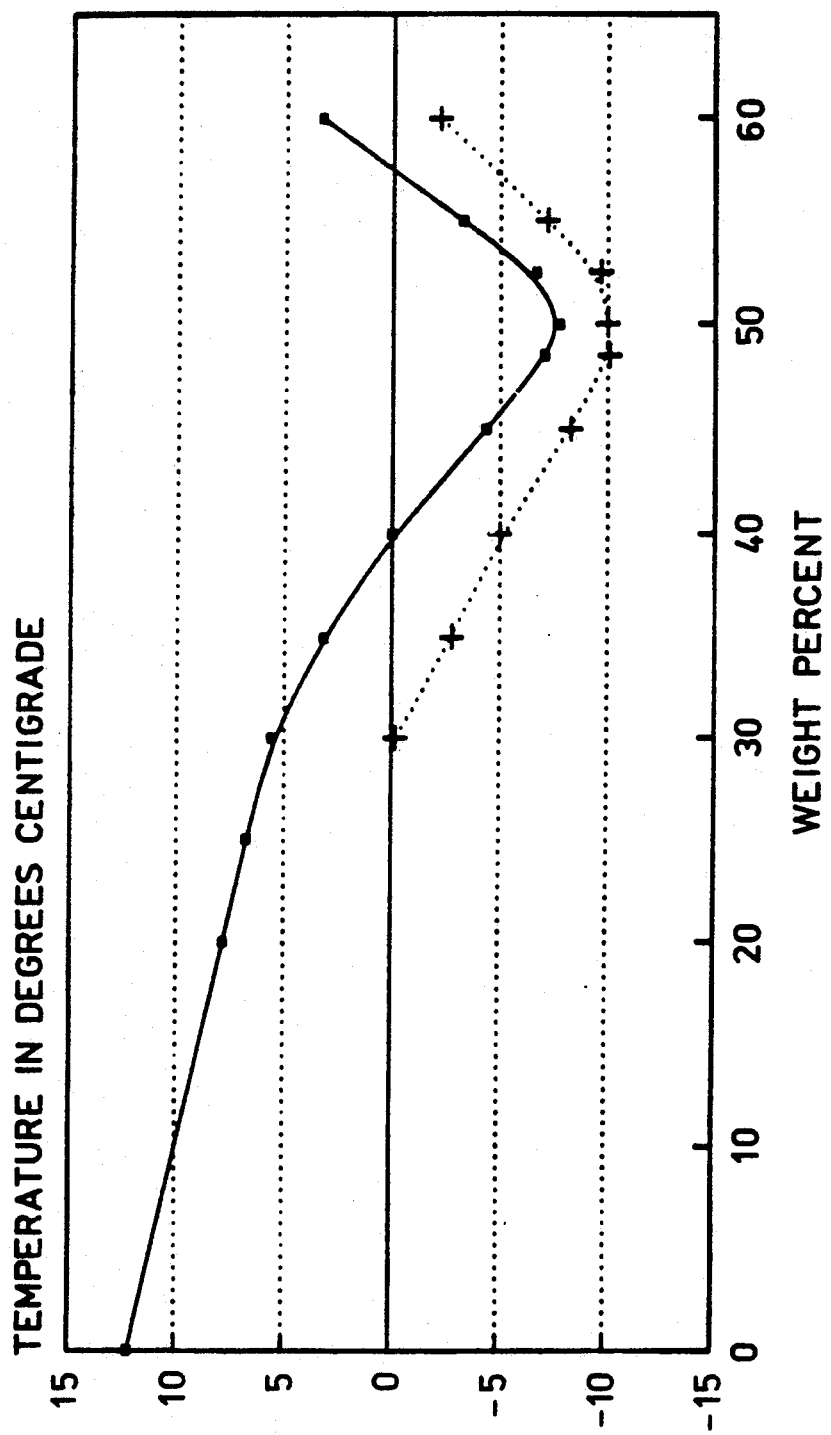
FIG. 6 shows the freezing characteristics of the fluids of Examples 2 and 6.

When all the samples were solid, a graphical plot of the accumulated evidence was prepared. The result for the compositions of Example 1 and of Example 2 are shown in FIGS. 5 and 6, respectively. The upper curve is the 'Solidus' line; i.e., above the curve, the compositions are entirely free of solids. The dashed curves at somewhat lower temperatures show where about 5% solids are present.

For example, if one desired the lowest 'freezing point' composition of FIG. 5 (Example 1) the choice would be about 55% biphenyl-diphenyl oxide eutectic and 45% of 3:1 ortho-terphenyl/meta-terphenyl component.

Better freeze protection can be obtained by utilizing the compositions of Example 2. In this case, the ternary eutectic of biphenyl/ortho-terphenyl/meta-terphenyl was blended with varying amounts of diphenyl oxide. This illustrates the complexity of blending components of present invention as regards freeze point. Given four blend components, there are six binary eutectic compositions. Example 2 utilized one ternary eutectic composition; others exist. In practice, the most preferred composition to employ as a heat transfer fluid in accordance with the present invention will be chosen on factors which could involve economics of production, or factors not relating to freeze protection. Blends of the components of the present invention, whatever the rationale for selection, will all yield outstanding high temperature thermal stability, low hydrogen permeation rates, low freeze points, and good pumpability at lower temperatures Viscosity data were measured for the clear liquids of Example 1. These data are tabulated below.

TABLE 4

| | Viscosity Data | | | |
|---|---|---|---|---|
| | Viscosity in cSt at Temperature (°C.) | | | |
| Fluid No. | 1.7 | 25.0 | 37.8 | 98.9 |
| 2 | 22.4 | 7.00 | 4.81 | 1.32 |
| 3 | 36.9 | 9.65 | 7.19 | 1.53 |

TABLE 4-continued

Viscosity Data

| Fluid No. | Viscosity in cSt at Temperature (°C.) | | | |
|---|---|---|---|---|
|  | 1.7 | 25.0 | 37.8 | 98.9 |
| 4 | 61.7 | 13.60 | 13.20 | 1.72 |

These low viscosity data illustrate the outstanding fluidity of the compositions of the present invention at temperatures near 0° C. Normally fluids having viscosities lower than 2,000 cSt are regarded as being pumpable.

EXAMPLE 4

The effect of impurities on hydrogen permeation rate was investigated utilizing the Hydrogen Permeation Test. Two of the components of the present invention were utilized in this comparison, biphenyl and diphenyl oxide. The two blend components were present in the eutectic composition in each of the three fluids, i.e., 73.5% diphenyl oxide and 26.5% biphenyl. A standard procedure was utilized in the Hydrogen Permeation Test. About 16.9 liters of degassed fluid was charged to the test loop and circulated while heating to 393° C. When the desired temperature was reached the expansion tank was closed off from the circulating portion of the fluid. The pressure of the system was established at 1,746.7 k Pa with the accumulator. This point in the experiment is taken to be time zero. Permeation measurements were made periodically and a plot of hydrogen permeation rate versus time constructed.

The eutectic mixture of this example are characterized below for impurity content.

TABLE 5

| Fluid No. | Total Impurity Content (ppm) |
|---|---|
| 15 | 700 |
| 16 | 400 |
| 17 | 93 |
| 17a | 25 |

Results of the Hydrogen Permeation Test are shown in FIG. 1. As can be noted, hydrogen permeation rates increase with time. For purposes of comparing the fluids the permeation rates at 400 hours and at time zero were determined. The time zero value is obtained by extrapolating the monotonically increasing curves for each fluid back to time zero. These values are tabulated below.

TABLE 6

| Fluid No | Permeation Rate (l-torr/hr-cm$^2$) | |
|---|---|---|
|  | 0 Hours | 400 Hours |
| 15 | 0.00024 | 0.00037 |
| 16 | 0.00009 | 0.00023 |
| 17 | 0.00006 | 0.00010 |

As can be noted, purer fluids have the lower permeation rates. This is shown graphically in FIG. 3. A direct relationship exists between impurity content and permeation rate. The improvement shown is extremely valuable in applications such as the solar energy collecting application. For example, each solar collector is quite expensive and thousands of collectors are utilized in each plant. Collector life (as measured by need to replace collectors due to substantial loss of jacket-vacuum) is improved by about a factor of four by lowering the impurity level of the example fluid by about a factor of 7.5.

The importance of purity is established for the four component blends of the present invention in the next two examples. In Example 5 permeation data were gathered on a biphenyl-diphenyl oxide - orthoterphenyl - meta-terphenyl composition from Example 1. In Example 6 direct measurements of the effects of individual impurities contained in the terphenyls are shown.

EXAMPLE 5

Fluid No. 3 from Example 1 was run in the Hydrogen Permeation Test. It contained 15.9% biphenyl, 44.1% diphenyl oxide, 30.0% ortho-terphenyl and 10.0% meta-terphenyl. The total impurity content of the fluid was about 130 ppm. Fluid No. 3 was composited from biphenyl which was purified by the oxidation technique disclosed herein. The diphenyl oxide was purified by distillation. The quaternary blend was further purified by passage through a column of activated alumina to remove alkyl substituted phenols as disclosed herein. The terphenyls were purified by crystallization from hexane as disclosed herein. Results from the Hydrogen Permeation Test are shown in FIG. 2. The permeation rate at time zero is 0.00006 l-torr/hr-cm$^2$ and at 400 hours is 0.000072 l-torr/hr-cm$^2$. Surprisingly, these results are even better than those of Fluid No. 17 of Example 4; i.e. the slope of the plot of permeation rate versus time is less for the four component blend of the present example. As can be seen, control of impurity content is directly related to permeation rate.

The importance of impurity content in biphenyl and in diphenyl oxide on hydrogen permeation rate was established in Example 4. In the next example the influence of impurities associated with manufacture of terphenyls was measured directly.

EXAMPLE 6

Fluid No. 3 of Example 5 was used in these measurements of hydrogen permeation. At the conclusion of measurements of hydrogen permeation on the fluid (which initially contained 130 ppm total impurities) the expansion tank was cut into the circulating loop. The accumulator contents were pumped into the expansion tank. At this point, a homogeneous blend of previously used and fresh fluid was available. To this fluid was added weighed amounts of impurities which result from the manufacture of polyphenyls.

This was accomplished by dissolving the pure compound in question (each material was purified to a level of about 100 ppm total impurity or less) with small amounts of Fluid No. 3 obtained from the expansion tank. The adulterated fluid was added back to the expansion tank and the system was homogenized. The accumulator was refilled, the expansion tank closed off, pressure of 1,746.7 k Pa re-established. This became time zero for each impurity addition. During this operation the temperature of the system was maintained at about 393° C.

Results are shown below. Addition of impurities is based on the total fluid composition.

TABLE 7

| IMPURITY | | PERRMEATION RATE (l-torr/hr-cm$^2$) | |
|---|---|---|---|
| Identity | Amount | 0 Hours | 200 Hours |
| phenyl naphthalene | 0.2% | 0.000085 | 0.00014 |

TABLE 7-continued

| IMPURITY | | PERRMEATION RATE (1-torr/hr-cm$^2$) | |
|---|---|---|---|
| Identity | Amount | 0 Hours | 200 Hours |
| phenanthrene | 0.8% | 0.000085 | 0.00011 |
| | 2.0% | 0.000100 | 0.00011 |
| methyl terphenyl | 200 ppm | 0.000098 | 0.00015 |
| | 600 ppm | 0.000022 | 0.00017 |

These results illustrate that impurities present from the manufacture of terphenyls lead to increased permeation rates. For example, the original Fluid No. 3 (with about 130 ppm total impurities) exhibited essentially constant permeation rate over 400 hours at a level of 0.00006 to 0.00007 1-torr/hr-cm$^2$. On addition of each of the three impurities of the present example, the permeation rate increased substantially. Of the three impurities, it appears that addition of phenanthrene leads to the least affect on permeation rate. Based on weight percent added, it appears methyl terphenyls lead to somewhat higher permeation rates than phenyl naphthalenes.

EXAMPLE 7

Hydrogen permeation is related to thermal stability; i.e., blend components which are not thermally stable at fluid operating temperatures will yield higher hydrogen permeation rates. The blend components of the present invention of biphenyl, diphenyl oxide, o-terphenyl and m-terphenyl were evaluated for thermal stability. About 30 ml of material are placed in a 304 s.s. ampoule, degassed using a nitrogen sparge, and capped. The ampoules are then placed in an oven and heated to desired temperatures. The temperature range of interest for the present fluids is about 300° to about 400° C. The ampoules are left at temperature for 1,000 hours, or even longer.

At the completion of the desired length of time-at-temperature the fluids are analyzed by gas chromatography for degradation products. For the blend components of the present invention, very little degradation is observed at 300° C., about 0.1% per 1,000 hours. Higher rates of degradation are observed as temperature increases until, at 400° C., degradation rates per 1,000 hours can be about 0.5-5%, depending on the particular blend component question. These rates are extremely low. Likewise, the rates of thermal degradation for quaternary mixtures of the present invention are also extremely low.

EXAMPLE 8

The fluids of the present invention possess excellent heat transfer properties. These properties are tabulated below for Fluid No. 3 of Example 1.

TABLE 8

| PROPERTIES | TEMPERATURE, °C. | | | | | |
|---|---|---|---|---|---|---|
| | 38 | 149 | 316 | 343 | 371 | 399 |
| Viscosity (centipoise) | 6.3 | 0.85 | 0.27 | 0.23 | 0.21 | 0.19 |
| Density (g/ml) | 1.056 | 0.970 | 0.817 | 0.792 | 0.759 | 0.727 |
| Thermal Conductivity (W/m-deg K) | 0.093 0.136 | 0.125 | 0.103 | 0.099 | 0.096 | 0.093 |
| Specific Heat (J/kg-deg K) | 1609 | 1908 | 2351 | 2427 | 2500 | 2573 |

Selected physical properties are tabulated in Table 9 below for Fluid No. 3 for Example 1.

TABLE 9

| Physical Properties | |
|---|---|
| Flash Point COC ASTM D92 | 154° C. |
| Fire Point COC ASTM D92 | 167° C. |
| Auto Ignition Temperature ASTM D2155 | 591° C. |
| Flammability Limits | 1-7% |
| Boiling Point (1.013 × 10$^{-5}$ N/M$^3$) | 299° C. |
| Thermal Expansion Coefficient | 0.000628 |

EXAMPLE 9

One embodiment of the present invention is a method for purifying components of the fluids of this invention. In this example an oxidation technique is used to purify the polyphenyl blend components. Specifically, this technique removes alkyl-moieties, and other readily oxized impurities, which contribute disproportionately to hydrogen permeation relative to their amounts present.

One kilogram of a mixture consisting essentially of o-terphenyl and m-terphenyl was obtained from a commercial polyphenyl manufacturing operation. Production impurities accompanying the desirable components included alkyl (multi-alkyl) terphenyls, fluorenes and alkyl-containing fluorenes, phenyl naphthalenes, anthracene, and phenanthrene. The reactor employed in this technique was comprised of Hastaloy steel. This material was charged to a reaction vessel along with 200 ml of hexanoic acid and 30 ml of toluene. A catalyst system comprising 10 gms cobaltous bromide and 4 gms Ce (III) acetate was charged. The vessel was closed and configured for pressure operation with 857.35 k Pa oxygen gas. With good agitation, the temperature was increased to 165° C. and oxygen pressure was maintained for 3 hours. The reactor was cooled and oxygen pressure vented. Reactor contents were transferred to a vacuum still. A small amount of water along with the hexanoic acid were stripped from the terphenyl reaction mass.

Impurities in the original charge which were oxidized by the just described treatment were then destroyed by heating with strong alkali metal hydroxides, specifically the eutectic mixture of potassium hydroxide and sodium hydroxide. The eutectic composition is 51.03% NaOH and 48.97% KOH. Sixty grams of this eutectic were added and the batch stirred at 250° C. for three hours. Vacuum was applied, and purified terphenyls were distilled from the reactor. About 950 grams of purified product was obtained.

Analysis of this product by gas chromatography revealed that objectional materials from the standpoint of hydrogen permeation were reduced by a factor of seventy. The desired terphenyl product was substantially unaffected by the oxidation treatment and subsequent steps.

EXAMPLE 10

A different purification technique was employed to obtain substantially pure o-terphenyl and substantially pure m-terphenyl. The technique used solvent crystallization from a paraffinic solvent. The starting raw materials in this example were about 95 to 98% pure individual terphenyl isomers. These starting materials can be obtained conveniently by fractional distillation of commercial polyphenyl mixtures.

Ten kilograms of a 95% o-terphenyl material were dissolved in 50 liters of hexane, previously purified by distillation. The mixture was heated to 60° C. to obtain a clear solution.

The clarified solution was allowed to cool without stirring. When the temperature reached 30° C., the mixture was seeded with pure o-terphenyl and further cooled slowly to 0°-5° C. The material was then left undisturbed at the low temperature for 16 hours, affording a substantial crop of large crystals of essentially pure o-terphenyl. Supernatant liquid was decanted and the crystals were washed onto a filter with 10 liters of pure, cooled hexane. After air-drying, the crystals were melted under vacuum to remove traces of hexane. Product obtained in this way analyzed 99.99% o-terphenyl by gas chromatography.

Meta-terphenyl is purified in the same manner except that 5 kilograms of 95-98% starting raw material was dissolved in 50 liters of hexane. Seeding with pure m-terphenyl was done at about 50° C. The remaining steps are the same as just described for purifying o-terphenyl. Product purified in this manner analyzed 99.98% m-terphenyl by gas chromatography.

The o- and m-terphenyl blend components from this example were blended with biphenyl and diphenyl oxide (eutectic composition) in the ratio of 40% terphenyl and 60% biphenyl plus diphenyl oxide. The o-terphenyl/m-terphenyl ratio was 3:1. The diphenyl oxide employed contained about 30 ppm total impurity, and the biphenyl contained about 93 ppm total impurity as determined by gas chromatography. The resultant blend (Fluid No. 3 from Example 1) was evaluated for hydrogen permeation. The result, from Example 5, was about 0.00006 1-torr/hr-cm$^2$ at about 390° C. and 1,746.7 k Pa. This fluid remained clear at temperatures as low as $-4°$ C. and only a minor amount of crystals was observed at $-7°$ C.

Preferred fluids of the present invention have been cited above. They include mixtures comprising biphenyl and diphenyl oxide with (1) phenoxybiphenyls, (2) diphenoxybenzenes, and (3) with terphenyls. Other preferred fluids include biphenyl and napthalene with (1) phenoxybiphenyls; (2) diphenoxybenzenes; and (3) terphenyls. These mixtures when treated in accordance with this invention will be substantially free of impurities which adversely affect hydrogen permeation rates at elevated temperatures up to 400° C. and even higher. It is envisaged that other components can be present in the mixtures. Whatever these components are, they will be substantially free of impurities which affect its high temperature hydrogen permeation rate. While the following are not meant to be limiting, components which may be included in the fluids of the present invention and to the preferred quaternary mixtures of the present invention include phenyl napthalene, phenoxybiphenyls, diphenoxybiphenyls, three ring aromatic thioethers, dibenzofuran, phenathrene, terphenyls, fluorenes, phenyl fluorenes and quaterphenyls. The presence of some of these additive components may, in some cases, be the result of the manufacturing process employed to produce the preferred components of a particular fluid; e.g., phenyl napthalene, phenanthrene and fluorenes can result from the manufacture of polyphenyls. In other cases, desirable fluid properties can result from deliberate use of additional components. For example, use of quaterphenyls with a mixture of biphenyl, diphenyl oxide, o-terphenyl and m-terphenyl can result in lower melting point with lower vapor pressure. On the other hand, low temperature viscosity may increase.

When the fluids need to be useful at temperatures lower than 400° C., the list of materials which can be present can be broadened; i.e., less stable materials in terms of hydrogen permeation or thermal stability. At temperatures of about 375° C. or lower materials which can be added include methyl-or polymethyl-biphenyls or -terphenyls or -phenoxy benzenes, cyclohexane or phenyl cyclohexanes. These materials should be substantially free from impurities which adversely affect hydrogen permeation or thermal degradation at the temperatures of their use.

Similarly, for operation at temperatures of about 300°-325° C. or lower materials which can be added include cyclic siloxanes, partially or completely hydrogenated terphenyls. The hydrogenated terphenyls can optionally contain alkyl substitution. At these lower temperatures methyl- and polymethyl-, ethyl-and polyethyl-, propyl- and polypropyl-, butyl- and polybutyl-substitution can be employed. These materials will be substantially free for impurities which effect hydrogen permeation or thermal degradation at the temperatures of their use.

In addition to the technical uniqueness of the fluids of the present invention, the fluids are quite acceptable for use from the standpoint of environmental and health-related considerations. From these standpoints the fluids of the present invention are also attractive.

EXAMPLE 11

A fluid of the present invention was composited by mixing diphenyl oxide with the three component polyphenyl eutectic comprising biphenyl, o-terphenyl and m-terphenyl. In the present example, the weight ratios are 60% by weight diphenyl oxide and 40% by weight polyphenyl eutectic.

The fluid of the present example was evaluated for hydrogen permeation rate by the Hydrogen Permeation Test. The diphenyl oxide employed had a total impurity level of 31 ppm. the polyphenyl eutectic portion of the fluid was purified by the oxidative purification method disclosed in the specifications of the present invention. Conditions employed for purification were 160° C. with 1,135.3 k Pa oxygen pressure. The catalyst system employed comprised cobaltous bromide with cerium acetate; the acid was hexanoic acid and about 20,000 ppm toluene were added at the beginning of the purification run. The total impurity level of alkyl polyphenyl-type species was measured by high resolution gas chromatography. Total impurities eluting between o- and m-terphenyl were about 150 ppm.

At a temperature of about 391° C. and a pressure of 1,746.7 k Pa the measured permeation rate after 233 hours was less than $5 \times 10^{-5}$ 1-torr/hr-cm$^{+2}$. Water was present at the 300 ppm level.

The freezing point of the fluid of the present example was about $-6°$ C.

What is claimed is:

1. In a method of collecting solar energy involving the use of concentric conduits wherein a heat transfer fluid flows through the inner conduit and a relatively low vacuum is maintained in the annulus between the conduits, the improvement of using a heat transfer fluid composition comprising a blend of about 5-30% biphenyl, 25-75% diphenyl oxide, 10-50% ortho-terphenyl and 5-25% meta-terphenyl, said composition being substantially free of water and aryl compounds having alkyl substituents and maintaining by its thermal stability at temperatures of at least 350°-400° C. and pumpability at temperatures of −10° C. or lower.

2. In a method of collecting solar energy involving the use of concentric conduits wherein a heat transfer fluid flows through the inner conduit and a relatively low vacuum is maintained in the annulus between the conduits, the improvement of using a heat transfer fluid composition comprising a blend of about 5-15% biphenyl, 45-75% diphenyl oxide, 15-45% ortho-terphenyl, and 5-20% meta-terphenyl, said composition being substantially free of aromatic compounds having alkyl substituents such that the fluid has a hydrogen permeation rate of less than about $6 \times 10^{-4}$ 1-torr./hr $cm^2$ as determined by the Hydrogen Permeation Test.

3. A method of claim 1 wherein the ratio of biphenyl to ortho-terphenyl to meta-terphenyl is 30.9:47.5:21.6.

4. A method of claim 1 wherein the heat transfer fluid composition comprises a blend of from about 10% to about 23% biphenyl, from about 25% to about 65% diphenyl oxide, from about 16% to about 35% ortho-terphenyl and from about 7% to about 16% meta-terphenyl.

5. The method of claim 1 wherein the heat transfer fluid contains at the most 2000 ppm of aryl compounds with alkyl substituents.

6. The method of claim 2 wherein the heat transfer fluid contains at the most 2000 ppm of aryl compounds with alkyl substituents.

* * * * *

UNITED STATES PATENT AND TRADEMARK OFFICE
CERTIFICATE OF CORRECTION

PATENT NO. : 5,075,022
DATED : December 24, 1991
INVENTOR(S) : James W. Gambell et al It is certified that error appears in the above-identified patent and that said Letters Patent is hereby corrected as shown below:

In column 1, line 50, insert a period after the word "glass".

In column 2, line 14, insert a period after the word "selected".

In column 5, line 51, insert "5%" after the word "about".

In column 7, line 14, delete "$10^{31\ 5}$ and insert --$10^{-5}$-- therefor.

In column 7, line 21, delete "$10^{31\ 6}$ and insert --$10^{-6}$--therefor.

In column 8, line 19, insert a period after the word "section".

In column 8, line 43, insert a period after the word "section".

In column 12, line 18, delete the word "cent".

Signed and Sealed this

Sixth Day of April, 1993

Attest:

STEPHEN G. KUNIN

Attesting Officer

Acting Commissioner of Patents and Trademarks